Oct. 11, 1927.
S. F. WESTON
1,644,864
BOILER GAUGE GLASS
Filed March 21, 1924  4 Sheets-Sheet 1
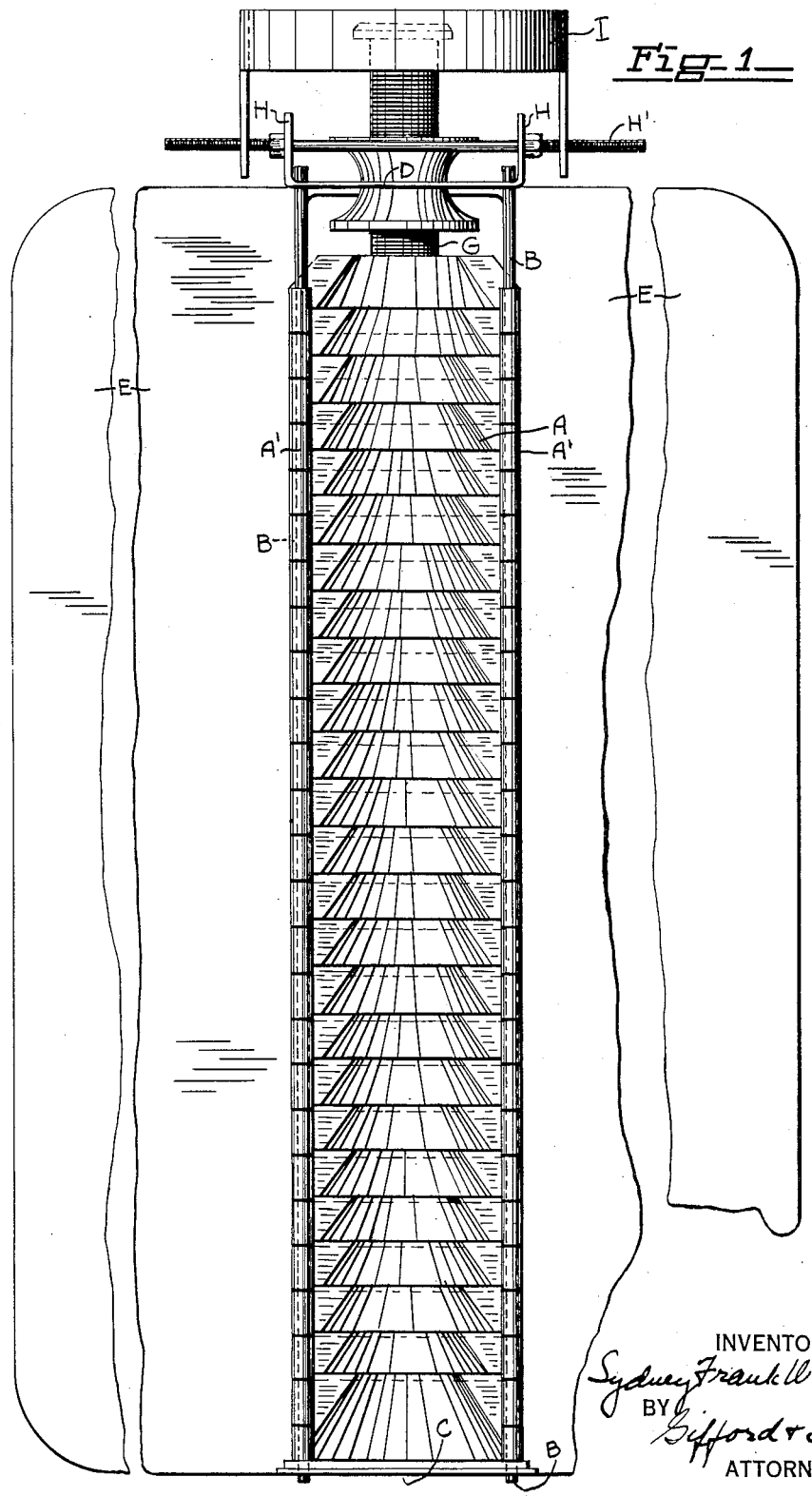

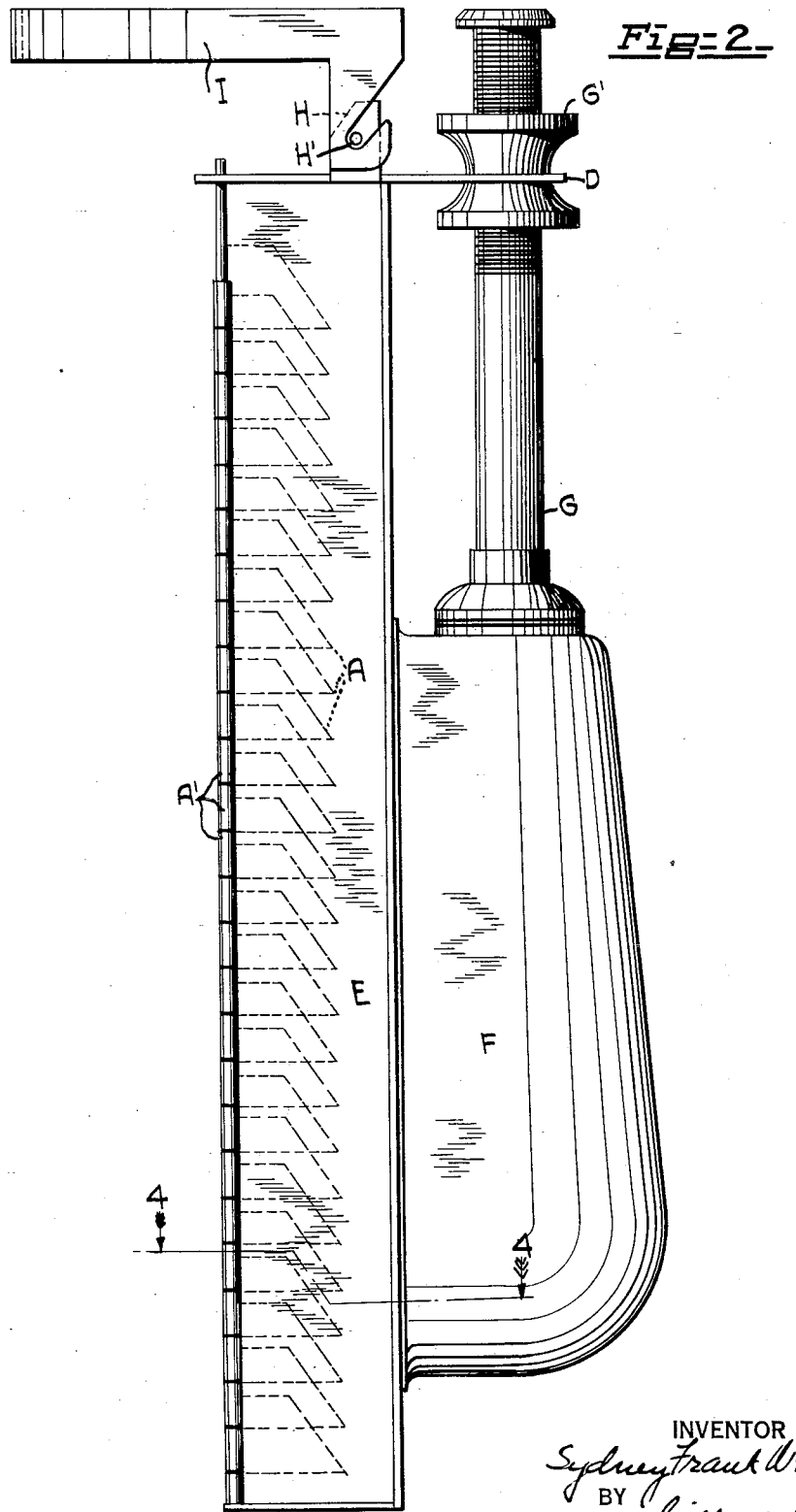

Oct. 11, 1927. 1,644,864
S. F. WESTON
BOILER GAUGE GLASS
Filed March 21, 1924 4 Sheets-Sheet 3
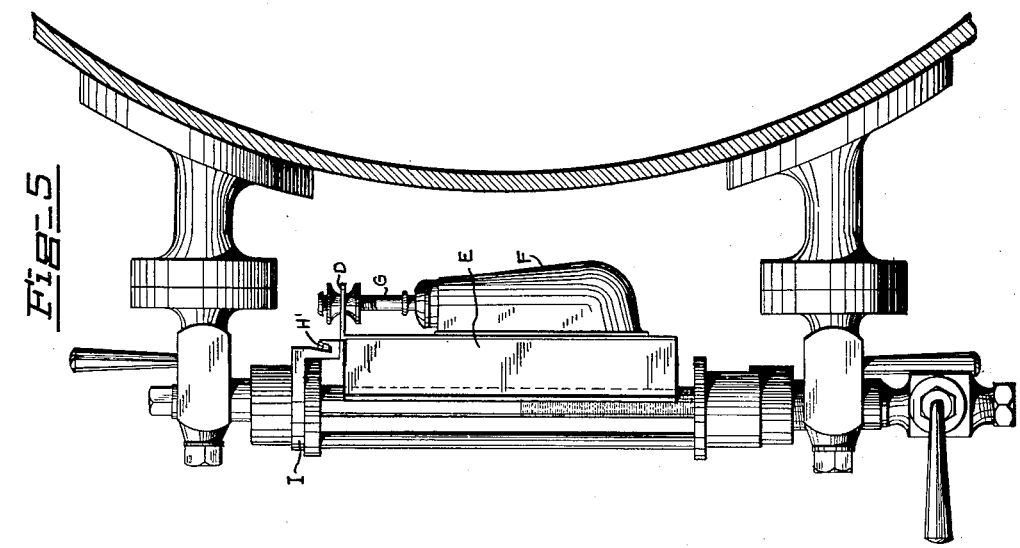
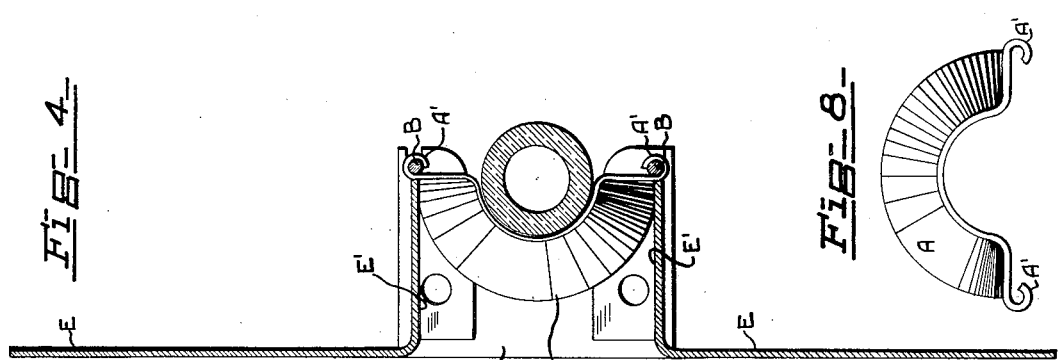
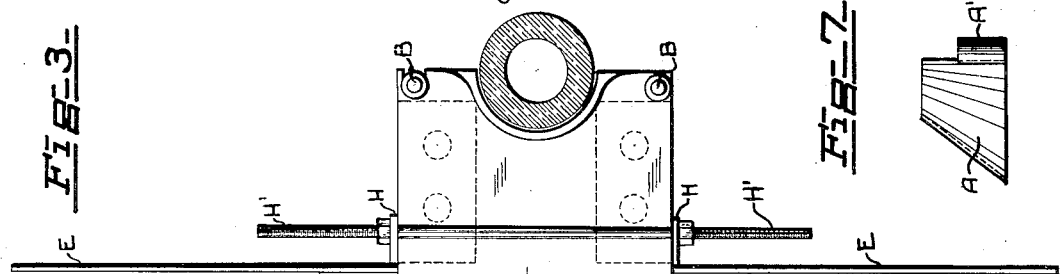
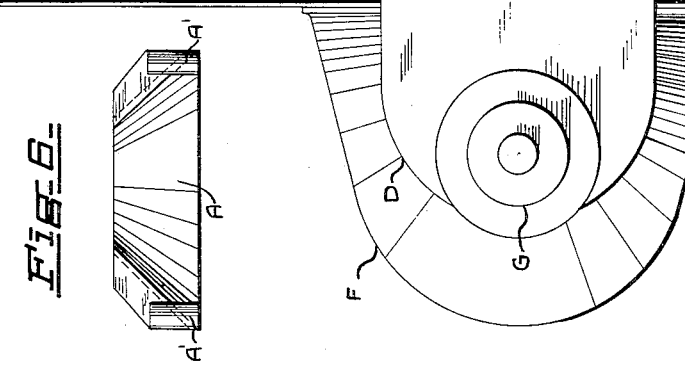
INVENTOR
Sydney Frank Weston
BY Gifford & Scull
ATTORNEYS Oct. 11, 1927.
S. F. WESTON
1,644,864
BOILER GAUGE GLASS
Filed March 21, 1924　　4 Sheets-Sheet 4
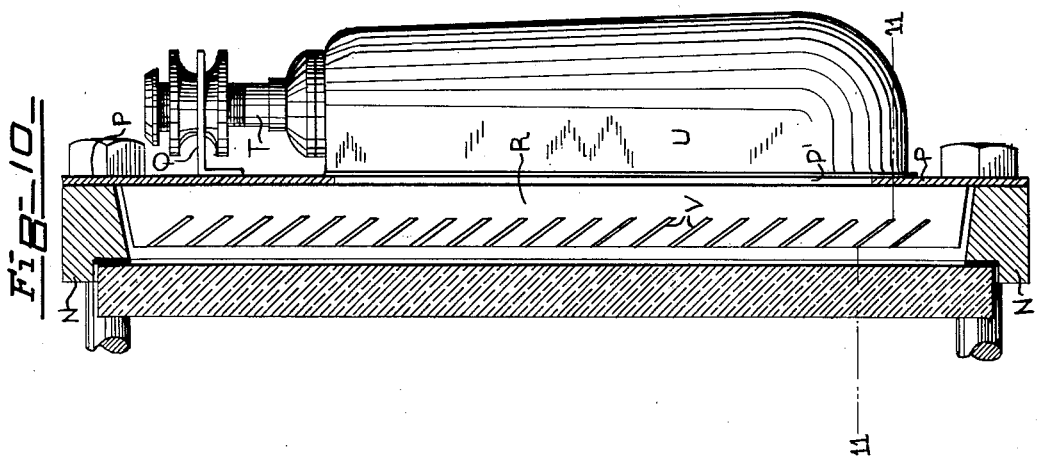
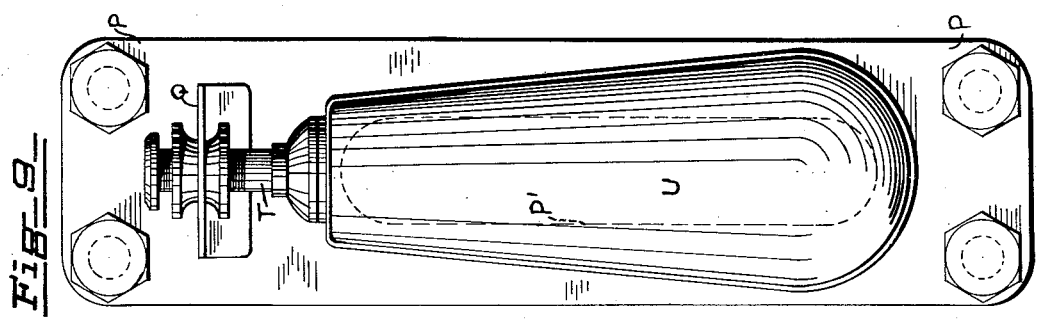
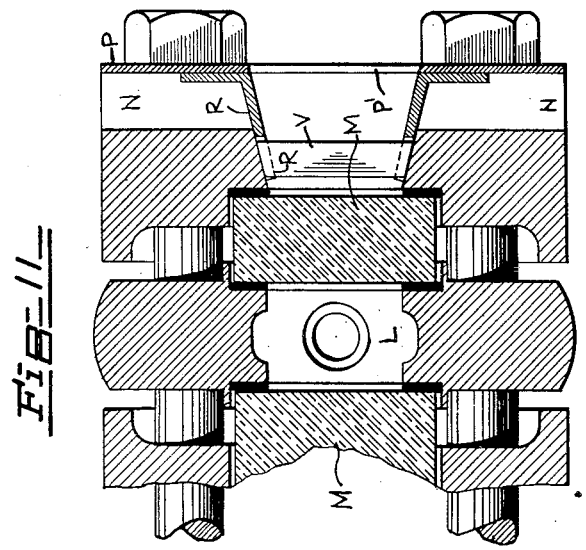
INVENTOR
Sydney Frank Weston
BY
Gifford & Scull
ATTORNEYS Patented Oct. 11, 1927.

1,644,864

UNITED STATES PATENT OFFICE.

SYDNEY FRANK WESTON, OF LONDON, ENGLAND, ASSIGNOR TO THE BABCOCK & WILCOX COMPANY, OF BAYONNE, NEW JERSEY, A CORPORATION OF NEW JERSEY.

BOILER-GAUGE GLASS.

Application filed March 21, 1924, Serial No. 700,802, and in Great Britain March 26, 1923.

My invention relates to boiler gauge glasses and more particularly to an improved fitting therefore permitting a clear indication to be given of the water level. The invention will be best understood from the following description taken with the annexed drawings, in which Figure 1 is a view in elevation of an illustrative embodiment; Fig. 2 is a side view thereof; Fig. 3 a plan view; Fig. 4 a section taken on line 4—4 of Fig. 2; Fig. 5 is a view showing the fitting in place; Figs. 6, 7 and 8 are detailed views of a truncated, conical section forming a part of my invention; Fig. 9 is a rear elevational view of another illustrative embodiment; Fig. 10 is a vertical view, partly in section, taken at right angles to Fig. 9, and Fig. 11 is a section taken on line 11—11 of Fig. 10.

Both illustrative embodiments show a series of light shields comprising elements that present inclined surfaces spaced to allow upwardly inclined beams of light to pass between them to illuminate the gauge glass, the effect of the rays of light being to illuminate the meniscus, particularly so that the water level can be clearly seen even though the gauge glass may have become dirty.

Referring to Figs. 1 to 8 of the drawings, a series of spaced, inclined elements in the form of semi-annular plates or segments A with lateral looped portions A' are strung on rods B between a bottom plate C and a top plate D, the plates or segments A being spaced by means of the looped portions so as to permit light to pass upward directly between them from behind. At each side of the pile of plates A is arranged a side plate E of L-shaped section preventing the passage of indirect light from behind at the sides. Behind the opening defined by the side plates E is disposed a source of artificial light, such as a lamp (not shown) combined with a reflector F supported by a tube G depending from the top plate D. On the top plate D are formed lugs H through which passes a pin H' engaged by a clip I which may fit around the upper gauge cock, as indicated in Fig. 5. The hinged attachment of the fitting to the clip I provides in effect an explosion door, it being understood that the bursting of the gauge glass will cause the fitting to swing out, releasing the pressure on the side of the glass next to the fitting and obviating risk of breakage of the coned plates A. Suitably the adjacent faces E' of the side plates E are formed as reflectors. The position of the reflector F and the lamp may be adjusted lengthwise of the gauge glass by means of the nut G' threaded to the tube G.

The fitting thus constituted is arranged behind the usual gauge glass, suitably as indicated in Fig. 5, in a position in which the gauge tube and the conical frusta A are coaxial. The gauge glass is illuminated by rays of light passing upward from the lamp between the spaced plates A which cause the meniscus to appear as a very bright bubble. The water level can be seen from either side as well as from a position directly in front of and below the glass. If desired, the arrangement may be used in conjunction with sheets of colored glass or the like so as, for instance, to provide colored and illuminated safe working limits for the gauge.

Referring to Figs. 9 to 11, the improved gauge fitting is shown as applied to a water level gauge of the kind including a chamber L of which the front and rear walls M are formed of glass plates. Secured to the rear frame member N is a plate P, to which are attached a bracket Q and side plates R, and which is provided with an aperture $P^1$ for the passage of light from a lamp (not shown). From the bracket Q depends a tube T which carries the lamp and the associated reflector U. The side plates R prevent indirect light from behind from entering at the sides and are each formed with a series of inclined slits into which are fitted inclined plates V between which pass beams of light from the lamp whereby to illuminate the meniscus as described in connection with the first embodiment.

I claim:

1. A gauge glass fitting comprising a series of spaced, inclined, superimposed, elements having substantially parallel surfaces which overlap to form channels, said elements being adapted to be placed between a source of artificial light and the gauge glass, and means for securing said elements in place.

2. A gauge glass fitting comprising in combination, a source of artificial light, a series of spaced, inclined, elements having substantially parallel surfaces in front of said source of light which overlap to form channels for rays of light and adapted to be placed adjacent the gauge glass, and means for securing said elements in place.

3. A gauge glass fitting comprising in combination, a source of artificial light, a series of spaced, inclined, elements having substantially parallel surfaces in front of said source of light which overlap to form channels and are adapted to be placed adjacent the gauge glass, said series of elements being also substantially parallel to the adjacent surface of the gauge glass, and means for securing said elements in place.

4. A gauge glass fitting comprising in combination, a source of artificial light, a series of spaced, inclined, elements having substantially parallel surfaces in front of said source of light which overlap to form channels and are adapted to be placed adjacent the gauge glass, means for securing said elements in place and in a fixed position with respect to said light source, and pivot means for mounting said securing means on the gauge glass fitting.

5. A gauge glass fitting comprising in combination, a source of artificial light, a series of truncated, conical segments located in front of said light source and adapted to be placed adjacent a gauge glass of the tubular type, said segments being concentric with said glass and means for securing said segments in place.

6. A gauge glass fitting comprising in combination, a source of artificial light, a series of inclined, substantially parallel plates located in front of said light source and adapted to be placed adjacent a gauge glass, and means for securing said plates in place with said plates parallel and inclined to the vertical 7. A gauge glass fitting comprising in combination, a source of artificial light, a series of downwardly inclined, substantially parallel plates located in front of said light source and adapted to be placed adjacent a gauge glass, and means for securing said plates in place with said plates parallel and inclined to the vertical.

8. A gauge glass fitting comprising in combination, a source of artificial light, a series of spaced, inclined, elements having substantially parallel surfaces in front of said source of light which overlap to form channels and are adapted to be placed adjacent the gauge glass, means for securing said elements in place and means for adjusting the position of said light source lengthwise of said series of elements.

9. In combination with a gauge glass, a source of light positioned so as to illuminate said glass, and means disposed between said source and said glass for directing parallel bundles of rays from said source upwardly so as to illuminate the meniscus of the liquid in said gauge glass from beneath.

10. A gauge glass fitting comprising a series of spaced, inclined, superimposed, elements having substantially parallel surfaces which overlap to form channels, said elements being adapted to be placed between a source of artificial light and the gauge glass.

11. A gauge glass fitting comprising a series of spaced, inclined, superimposed, upwardly directed elements having substantially parallel surfaces which overlap to form channels, said elements being adapted to be placed between a source of artificial light and the gauge glass.

SYDNEY FRANK WESTON.